United States Patent [19]

Hsu et al.

[11] 3,868,412

[45] Feb. 25, 1975

[54] 9,15-DIOXO-5-CIS-PROSTENOIC ACID

[75] Inventors: Charles Hsu, Skokie; James Jiu; Seth Setsuo Mizuba, both of Morton Grove, all of Ill.

[73] Assignee: G. D. Searle & Co., Chicago, Ill.

[22] Filed: June 25, 1973

[21] Appl. No.: 373,427

Related U.S. Application Data

[63] Continuation-in-part of Ser. No. 295,209, Oct. 5, 1972, Pat. No. 3,788,947.

[52] U.S. Cl. ............. 260/514 D, 195/30, 195/51 R, 260/468 D, 424/317
[51] Int. Cl. ............................................. C07c 61/36
[58] Field of Search...... 260/514 D, 514 UA, 468 D

[56] References Cited
UNITED STATES PATENTS
3,773,795  11/1973  Bagli et al. ...................... 260/345.7

OTHER PUBLICATIONS

Crubbe et al., Tet. Letters, 115, 1972.

*Primary Examiner*—Robert Gerstl
*Attorney, Agent, or Firm*—John J. McDonnell; Elliot N. Schubert

[57] ABSTRACT 9,15-Dioxo-5-cis-prostenoic acid is formed from 15 (S)-hydroxy-9-oxo-5-cis-10,13-trans-prostatrienoic acid ($PGA_2$) by the fermentative action of *Dactylium dendroides* (NRRL 2575). This compound is a diuretic which lacks vasodepressor activity.

1 Claim, No Drawings

9,15-DIOXO-5-CIS-PROSTENOIC ACID

This is a continuation-in-part of our copending application Ser. No. 295,209 filed Oct. 5, 1972 now U.S. Pat. No. 3,788,947.

9,15-Dioxo-5-cis-prostenoic acid is formed from 15(-S)-hydroxy-9-oxo-5-cis-10,13-trans-prostatrienoic acid (PGA$_2$) by the fermentative action of the fungus *Dactylium* and in particular *Dactylium dendroides* (NRRL* 2575).

*NRRL cultures can be obtained at ARS Culture Collection 1815 North University Street, Peoria, Illinois 61604

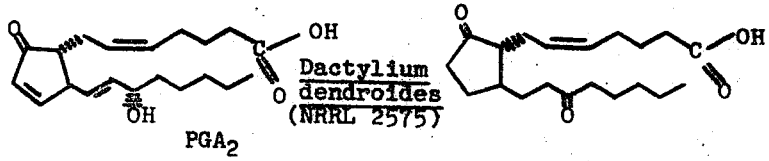

PGA$_2$

SCHEME I 9,15-Dioxo-5-cis-prostenoic acid is a new and unobvious composition of matter. A 9,15-dioxo prostenoic acid ester is described by J. F. Bagli and Tibor Bogri, *Tetrahedron Letters*, No. 21 pp. 1639 (1969) but in that compound the double bond is of the trans configuration and located in the 13,14-positon. 9,15-Dioxo prostanoic acid is also described in the above reference. It is recognized in the prostaglandin art that the number, sterochemistry and location of carbon to carbon double bonds in the side chains dramatically alter the properties of prostaglandins.

PGE$_2$ and PGA$_2$ are examples of prostaglandins which exhibit a diuretic effect which is accompanied with vasodepression, *The Prostaglandins*, edited by Peter W. Ramwell, Plenum Press, New York, 1973, Chapter 5. The present compound is distinctive in its activity in that it exhibits a diuretic effect without affecting vascular resistance i.e. no vasodepression. It therefore exhibits selective diuretic activity and selective activity is a much sought after goal in the prostaglandin art.

The diuretic properties of the present compounds are demonstrated by their ability to reverse the action of antidiuretic hormone (ADH).

Male Badger rats (Badger Research Corp., Madison, Wisconsin) weighing 150–175 g. were maintained at 70°–73°F. During the first week the animals were conditioned once to (a) bladder palpation, (b) gastric intubation with a French No. 8 catheter followed by tap water (5 ml./100 g.) and (c) 0.5 ml. of 0.9% NaCl, sp. On the 7th or 8th day after arrival the first experiment (week I) was performed: 18 hours prior to the test the rats were deprived of food; but allowed water ad libitum. The following day the animals (ca. 180 g./rat, range 160–200 g.) were placed in groups of 4 with no more than a 2% variation in group mean weights about the grand mean. At 0 time following bladder palpation the animals were (a) loaded orally with 0.21% NaCl (5 ml./100 g.) containing 5% ethanol (v/v) and 5% propylene glycol (v/v), together with dissolved or suspended test compound, and (b) 1 milliunit (mU) of Pitressin (Parke, Davis & Co.,) per 100 g. in 0.2 ml. of 0.9% NaCl. sq. (neck). Sixty minutes later the animals were palpated, urine volume measured, and a second gavage (5 ml./100 g. of 2.5% ethanol in 0.20% NaCl) and a repeated dose of ADH administered. After 2 hours the test was terminated by palpation to insure complete recovery of a pooled urine sample. Urine volume and Na and K excretion were reported in ml./100 g./2 hours and uEq/100 g./2 hours, respectively. The animals were regrouped and retested 1 week later (week II, ca. 200 g./rat, range 170–210 g.). In most experiments 2 groups (8 rats) were tested at each dosage level.

The appropriate volume metameter for statistical evaluations of response was taken to be log volume. On the log volume scale, 50% reversal of the response to 1 mU ADH/100 g. was the midpoint between 1 mU and control log volume responses. (This point is equivalent to the geometric mean of the two extreme volume responses.) For a test compound, ED$_{50}$ was defined as the dose necessary to produce 50% reversal, as defined above, when given together with 1 mU ADH/100 g. The 95% confidence limits of the ED$_{50}$ were calculated according to Fieller's theorem on the fiducial limits of a ratio.

The effect of the present compounds on vascular resistance was measured by a variation of the method of Brady et al., J. Appl. Physiol., 18:645 (1963). Male Charles River rats weighing at least 300 g. were anesthetized with urethane (1.5 g./kg. ip). Heparin (10 mg./kg.) was used as the anticoagulant. Body temperature was maintained at 35 ± 0.5C. The isolated hindquarters were autoperfused at a constant flow rate by means of a Sigmamotor T-8 pump. Systemic and perfusion pressures were monitored with Statham P23AA transducers and a Sanborn Twin-Viso recorder. With a constant pump flow, changes in perfusion pressure are directly proportional to changes in vascular resistance. This is a sensitive method to measure changes in vascular resistance caused by vasopressor and vasodepressor substances.

Fermentation is ordinarily carried out in the medium wherein the organism is cultured. However, it is likewise possible to separate the fungal cells from the culture medium by centrifugation or other means and use the resultant cellular matter to implement the fermentation. Moreover, the cells can be ruptured ultrasonically or otherwise to facilitate access to enzymes present, which can be isolated by filtration or extracted with a solvent such as acetone or water and substituted for the organism or cells thereof.

A nutrient medium is required for culture of the organism, which is to say one containing assimiable nitrogen and carbon; and an adequate supply of sterile air should be maintained therein, for example, by exposing a large surface of the medium to the air or preferably passing it through the medium in quantities sufficient to support submerged growth.

Suitable nitrogen sources are thus normally employed for the purpose, including soy bean meal, corn-steep liquor, meat extract, protein (optionally digested), peptone, yeast extract, distillers' solubles, casein hydrolysate, nitrate, cottonseed meal and/or ammonium compounds. All of the foregoing materials excepting sometimes the last two serve also as carbon sources. Other carbon-containing substances satisfactory and conventionally used as nutrients are the carboyhydrates, for example, glycerol, glucose, fructose, sucrose, maltose, inositol, dextrin, starch and whey, among which inositol is additionally useful because of its unusual capacity to stimulate growth.

Phosphate, magnesium, and/or ferrous ions likewise may be incorporated in the culture medium as growthpromoting factors if desired; buffers may be added to assure that growth is initiated at a suitable pH; and wetting agents may be employed to improve contact between the prostaglandin and the fermenting agent. An anti-foaming agent is usually beneficial. Where isolated cells or enzymes are used to induce fermentation rather than the intact and growing organism, nutrients need not, of course, be present; but in either solvent the medium is customarily preponderantly aqueous.

A preferred embodiment of the present invention is conducted in a medium consisting of 150 parts of cottonseed meal, 65 parts by volume of cornsteep liquor, 50 parts of Dextrose, 0.3 parts by volume of 6N hydrochloric acid, and 1000 parts by volume of water is sterilized by heating for 10 min. at 121°, whereupon it is cooled to 23 ± 1° and then is inoculated with 10 parts of a fluid culture of *Dactylium dendroides* (NRRL 2575). The inoculating fluid is prepared by incubating a seed culture for 72 hours in 100 parts by volume of the above mentioned sterilized medium from spores originating on an agar slant.

The inoculated medium is incubated for 168 hours and then 0.1 parts of 15(S)-hydroxy-9-oxo-5-cis-10,13-trans-prostatrienoic acid ($PGA_2$) is added. Incubation in the presence of the $PGA_2$ substrate is continued for 24 hours, at which time the mixture is extracted with dichloromethane. The dichloromethane layer is separated and the solvent is removed from this separated layer by evaporation in vacuo.

When the fungus, *Dactylium dendroides* (NRRL 2575), is incubated in the above medium for 48 hours prior to the addition of 0.1 parts of 15(S)-hydroxy-9-oxo-5-cis-10,13-trans-prostatrienoic acid ($PGA_2$), the products are 9,15-dioxo-5-cis-prostenoic acid and 9,15-dioxo-5-cis-8(12)-prostadienoic acid. In both fermentations the products are isolated by silica gel chromatography.

The following examples are presented to further illustrate the present invention. They should not be construed as limiting it either in scope or in spirit. In these examples quantities are indicated in parts by weight unless parts by volume are specified, and temperatures are indicated in degrees Centigrade (°C.).

EXAMPLE 1

A medium consisting of 150 parts of cottonseed meal, 65 parts by volume of cornsteep liquor, 50 parts of Dextrose, 0.3 parts by volume of 6N hydrochloric acid, and 1000 parts by volume of water is sterilized by heating for 1 hour at 121°, whereupon it is cooled to 23 ± 1° and then is incubated with 10 parts of a fluid culture of *Dactylium dendroides* (NRRL 2575). The inoculating fluid is prepared by incubating a seed culture for 72 hours in 100 parts by volume of the above mentioned sterilized medium from spores and mycelium originating on an agar slant.

The inoculated medium is incubated for 168 hours and then 0.1 parts of 15(S)-hydroxy-9-oxo-5-cis-10,13-trans-prostatrienoic acid ($PGA_2$) is added. Incubation in the presence of the $PGA_2$ substrate is continued for 24 hours, at which time the mixture is extracted with dichloromethane. The dichloromethane layer is separated and the solvent is removed from this separated layer by evaporation in vacuo. The crude extract is taken up in 850 parts by volume of phosphate buffer solution of pH 8 and this solution is extracted with hexane. The aqueous layer is made acidic with 6N hydrochloric acid to pH 2.5 and extracted with dichloromethane. The dichloromethane is removed by evaporation in vacuo. The remaining material is taken up in ethyl acetate and that which is insoluble in ethyl acetate is removed by filtration. The ethyl acetate is evaporated and the remaining material is taken up in a solution consisting of 97 parts by volume of benzene, 2 parts by volume of dioxane, and 1 part by volume of acetic acid. This solution is placed on a chromatographic column packed with silica gel and 9,15-dioxo-5-cis-prostenoic acid is eluted in a solvent system consisting of 92.3 parts by volume of benzene, 6.3 parts by volume of dioxane, and 1.4 parts by volume of acetic acid. 9,15-Dioxo-5-cis-8(12)-prostadienoic acid is eluted in a solvent system consisting of 87 parts by volume of benzene, 10 parts by volume of dioxane, and 3 parts by volume of acetic acid.

EXAMPLE 2

The procedure set out in Example 1 is followed with the exception that the *Dactylium dendroides* (NRRL 2575) is allowed to grow only for 48 hours before addition of 0.1 parts of 15(S)-hydroxy-9-oxo-5-cis-10,13-trans-prostenoic acid. The fermentation mixture is extracted and is prepared for column chromatography on silica gel also as described in Example 1. 9,15-Dioxo-5-cis-prostenoic acid is eluted in a solvent system consisting of 91 parts by volume of benzene, 7 parts by volume of dioxane, and 2 parts by volume of acetic acid. 15(S)-Hydroxy-9-oxo-5-cis-13-trans-prostadienoic acid is eluted in a solvent system consisting of 85 parts by volume of benzene, 10 parts by volume of dioxane, and 5 parts by volume of acetic acid.

What is claimed is:

1. 9,15-Dioxo-5-cis-prostenoic acid.

* * * * *